United States Patent [19]
Hojnacki

[11] Patent Number: 5,983,439
[45] Date of Patent: Nov. 16, 1999

[54] WINDSHIELD WIPER ASSEMBLY HAVING A VARIABLE SPEED DRIVE MECHANISM

[75] Inventor: George Hojnacki, Commerce Township, Mich.

[73] Assignee: TRICO Products Corporation, Rochester Hills, Mich.

[21] Appl. No.: 09/069,910

[22] Filed: Apr. 30, 1998

[51] Int. Cl.⁶ ........................................................ A47L 1/00
[52] U.S. Cl. .................. 15/250.3; 15/250.17; 15/250.27; 15/250.31; 74/437
[58] Field of Search .............................. 15/250.3, 250.13, 15/250.14, 250.27, 250.17, 250.31; 74/437

[56] References Cited

U.S. PATENT DOCUMENTS

| | | |
|---|---|---|
| 88,040 | 3/1869 | Huling . |
| 428,249 | 5/1890 | Harfield . |
| 1,142,051 | 6/1915 | O'Connor . |
| 2,027,818 | 1/1936 | Golber . |
| 2,194,045 | 3/1940 | Kvarnstrom . |
| 2,298,197 | 10/1942 | Coffey . |
| 2,397,599 | 4/1946 | Folberth et al. . |
| 2,407,215 | 9/1946 | Anderson . |
| 2,409,300 | 10/1946 | Miles . |
| 2,464,847 | 3/1949 | Coffey . |
| 2,477,441 | 7/1949 | Cole . |
| 2,516,808 | 7/1950 | Seger . |
| 2,625,833 | 1/1953 | Johnson . |
| 2,744,282 | 5/1956 | Dyer et al. . |
| 2,957,363 | 10/1960 | Ingham et al. . |
| 3,098,399 | 7/1963 | Berthiaume . |
| 3,125,892 | 3/1964 | Schwesinger . |
| 3,208,299 | 9/1965 | Leonard et al. . |
| 3,570,039 | 3/1971 | Ichinose et al. . |
| 3,590,415 | 7/1971 | Mori . |
| 3,651,699 | 3/1972 | Thomas et al. . |
| 3,675,103 | 7/1972 | Elliott . |
| 3,706,235 | 12/1972 | Duncan . |
| 4,160,389 | 7/1979 | Kubono . |
| 4,543,839 | 10/1985 | Buchanan, Jr. et al. ..................... 74/98 |
| 4,625,359 | 12/1986 | Egner-Walter et al. . |
| 4,630,327 | 12/1986 | Schmidt et al. . |
| 4,663,575 | 5/1987 | Juzswik et al. . |
| 4,732,048 | 3/1988 | Sakakibara et al. ......................... 74/98 |
| 4,934,014 | 6/1990 | Yamamoto . |
| 5,170,677 | 12/1992 | Yonekura et al. . |
| 5,209,134 | 5/1993 | Nguyen et al. . |
| 5,333,351 | 8/1994 | Sato . |
| 5,510,684 | 4/1996 | Moroi et al. . |
| 5,566,577 | 10/1996 | Klar . |
| 5,570,488 | 11/1996 | Deng . |
| 5,622,077 | 4/1997 | Blanchet et al. . |
| 5,659,211 | 8/1997 | Blanchet et al. . |

*Primary Examiner*—Robert J. Warden, Sr.
*Assistant Examiner*—Kaj K. Olsen
*Attorney, Agent, or Firm*—Bliss McGlynn, P.C.

[57] ABSTRACT

A windshield wiper drive mechanism which interconnects a motor and a wiper assembly which is movable between an in-wipe position and an out-wipe position on a windshield. The drive mechanism includes an elliptical gear set having a pair of eccentric gears driven by the motor and mounted on first and second idler shafts which are rotatable about first and second axes, respectively. An elliptical output gear is mounted on an output shaft which, in turn, is rotatable about an output axis. The elliptical output gear is disposed between the pair of eccentric gears such that the first and second eccentric gears engage the elliptical gear at positions substantially 180° opposite one another on the elliptical gear and so that the respective axes of the first and second idler shafts as well as the output axis of the output shaft lie in a single fixed plane. The elliptical gear set operatively drives the wiper assembly through the output shaft with the gear ratio varying sinusoidally to produce at the output shaft a minimum torque at the in-wipe and out-wipe positions during blade reversal and a minimum torque at a predetermined position therebetween. In addition, the elliptical gear set causes the velocity of the wiper assembly to vary sinusoidally from a minimum at the in-wipe and out-wipe positions to a maximum at predetermined positions therebetween.

15 Claims, 7 Drawing Sheets

WINDSHIELD WIPER ASSEMBLY HAVING A VARIABLE SPEED DRIVE MECHANISM

BACKGROUND OF THE INVENTION

1. Field of the Invention

The present invention relates, generally, to an automotive windshield wiper assembly and, more specifically, to a windshield wiper drive mechanism having a gear ratio which varies sinusoidally to produce an advantageous combination of wiper blade drive torque and speed.

2. Description of the Related Art

Windshield wiper systems commonly employed in the related art include pivotally mounted wiper blades which are oscillated across the automotive windshield between an in-wipe position, typically located near the cowl of the vehicle, and an out-wipe position, usually associated with an A-pillar on the vehicle in the case of the driver's side wiper blade. It is typically desirable to maximize the angular velocity of the blade assemblies between the in-wipe and out-wipe positions where the blade assembly is moving across the windshield in front of the driver to reduce the duration of each wipe cycle. On the other hand, it is also desirable to limit noise and inertia loading by reducing the velocity of the blade assemblies as they approach the wipe limits. These are two competing objectives which must be balanced in order to be successfully and economically obtained.

To achieve these objectives, windshield wiper systems in the related art have employed mechanical linkages between the blade assemblies and a drive motor which are designed to produce the designated torque and blade speed but at the expense of economy and efficient use of vehicle space. Special transmissions have also been interposed between the drive motor and blade assemblies for the same purpose. These transmissions can have gear ratios which vary sinusoidally so as to achieve maximum blade velocity between the wipe limits and maximum torque at the wipe limits. More recently, electrical controls have been proposed to achieve these results by varying the output of a variable speed electric motor which powers the windshield wiper systems. However, complex gearing and electronic speed control systems also increase the cost and weight of conventional windshield wiper systems.

Driver visibility has long been an important criteria in automotive design and has led to an increase in windshield surface area over the years. Windshield wiper systems, including drive motors, linkage mechanisms and blade assemblies, have also become larger in order to adequately service the increased surface area of the windshield. However, and as noted above, the oscillating motion of the wiper blade assembly and associated drive hardware causes high accelerations and inertia induced loads in the driving mechanism. Thus, system inertia continues to be a problem in the related art. High system inertia results in wiper pattern growth beyond design limits, including unacceptable contact by the wiper blades with vehicle A-pillars and cowls.

Thus, there continues to be a need in the art for a windshield wiper system capable of maximizing blade assembly velocity between the wipe limits while maximizing torque during wiper blade reversal at the wipe limits. In addition, there continues to be a need for such a windshield wiper assembly which incorporates low system inertia and economical manufacturing costs.

SUMMARY OF THE INVENTION

The present invention overcomes these deficiencies in the related art in a windshield wiper drive mechanism which interconnects a motor and a wiper assembly movable between an in-wipe position and an out-wipe position on a windshield. The drive mechanism includes an elliptical gear set having a pair of eccentric gears driven by the motor and mounted on first and second idler shafts. The eccentric gears are rotatable about first and second axes, respectively. An elliptical output gear is mounted on an output shaft which, in turn, is rotatable about an output axis. The elliptical output gear is disposed between the pair of eccentric gears such that the first and second eccentric gears engage the elliptical gear at positions substantially 180° opposite one another on the elliptical gear and so that the respective axes of the first and second idler shafts as well as the output axis of the output shaft lie in a single fixed plane. The elliptical gear set operatively drives the wiper assembly through the output shaft with the gear ratio varying sinusoidally to produce in the output shaft a maximum torque at the in-wipe and out-wipe positions during blade reversal and a minimum torque at predetermined positions therebetween. In addition, the elliptical gear set causes the velocity of the wiper assembly to vary sinusoidally from a minimum at the in-wipe and out-wipe positions to a maximum at predetermined positions therebetween.

By maximizing blade assembly velocity between the in-wipe and out-wipe positions, the duration of each wipe cycle may be effectively reduced. At the same time, by reducing blade assembly velocity and acceleration before the in-wipe and out-wipe positions are reached, the present invention reduces wipe pattern growth which reduces wiper blade collisions with the A-pillar and cowl even where average blade assembly velocities are very high, for example, during heavy rain.

One advantage of the present invention is that the deficiencies in the related art are overcome in a windshield wiper drive mechanism employing an elliptical gear set which is economical to manufacture and implement and which occupies no more space than that allocated for current transmissions used in windshield wiper systems of the related art.

Another advantage of the present invention is that these objectives are achieved economically when compared to special transmissions and electronic speed control systems which are presently being proposed in the related art.

Still another advantage of the present invention is that the drive mechanism enjoys reduced system inertia when compared to conventional systems. This advantage results in a reduction in wear in all system joints. The weight of various system components can also be reduced due to a decrease in peak loads. Lower system inertia also results in a reduction in part size because strength requirements are also reduced.

In addition, the symmetrical position and counter-rotation of the eccentric gears relative to the elliptical gear eliminates axial thrust loads acting on the drive motor which improves system stability and increases the useful life of the windshield wiper system.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
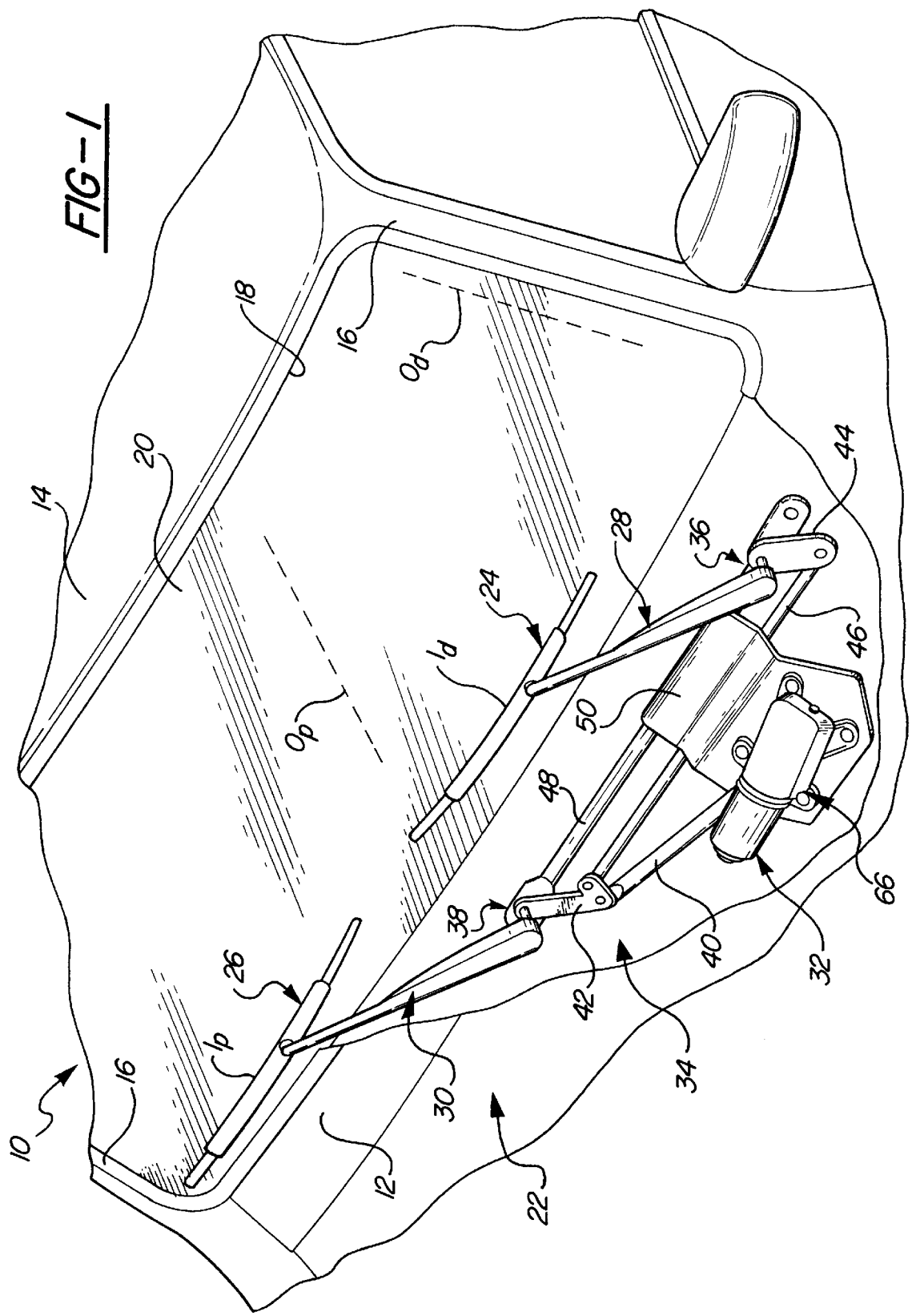
FIG. 1 is a partial schematic illustration of the front of an automotive body having a windshield wiper system of the present invention.

Referring now to the Figures, where like numerals are used to designate like structure, a portion of an automotive body is schematically illustrated at 10 in FIG. 1. The vehicle body includes a cowl 12, a roof 14 and a pair of laterally spaced front or "A" pillars 16 extending between the roof 14 and the cowl 12. The A-pillars 16, roof 14 and cowl 12 cooperate to define a generally rectangular opening 18 in which is supported a curved or "swept back" glass windshield 20.

A windshield wiper system is generally indicated at 22 in FIG. 1 and is employed to clean the glass windshield 20. The system 22 includes a pair of wiper assemblies, generally indicated at 24 and 26, which correspond to the driver and passenger side of the vehicle, respectively. Each wiper assembly 24, 26 is carried by a corresponding wiper arm assembly, generally indicated at 28, 30, respectively. An electrical motor, schematically shown at 32, is employed to power the system 22 to move the wiper assemblies 24, 26 in an oscillating manner across the surface of the glass 20.

In the system 22 depicted in FIG. 1, a linkage assembly, generally shown at 34, is interposed between the motor 32 and the wiper assemblies 24, 26 for translating rotational movement into pivotal movement of the wiper assemblies 24, 26 across the windshield. Each wiper arm 28, 30 is mounted to a pivot and shaft assembly 36, 38, respectively. The linkage assembly 34 includes a linkage drive arm 40 which drives the passenger side wiper assembly 26 through the pivot and shaft assembly 38 and pivot lever 42. The linkage drive arm 40 also powers the driver's side wiper assembly 24 through the pivot and shaft assembly 36 and through a similar pivot lever 44 acting through linkage slave arm 46. A unitizing tube 48 extends between driver and passenger pivot and shaft assemblies 36, 38. A motor bracket 50 is suspended from the unitizing tube 48 and supports the motor 32. It will be appreciated by those having ordinary skill in the art that the linkage assembly 34 may take any number of different configurations or may be substantially eliminated in favor of a motor used to drive each wiper assembly 24, 26 through the pivot and shaft assemblies 36, 38 or similar structure.

Figure 2:
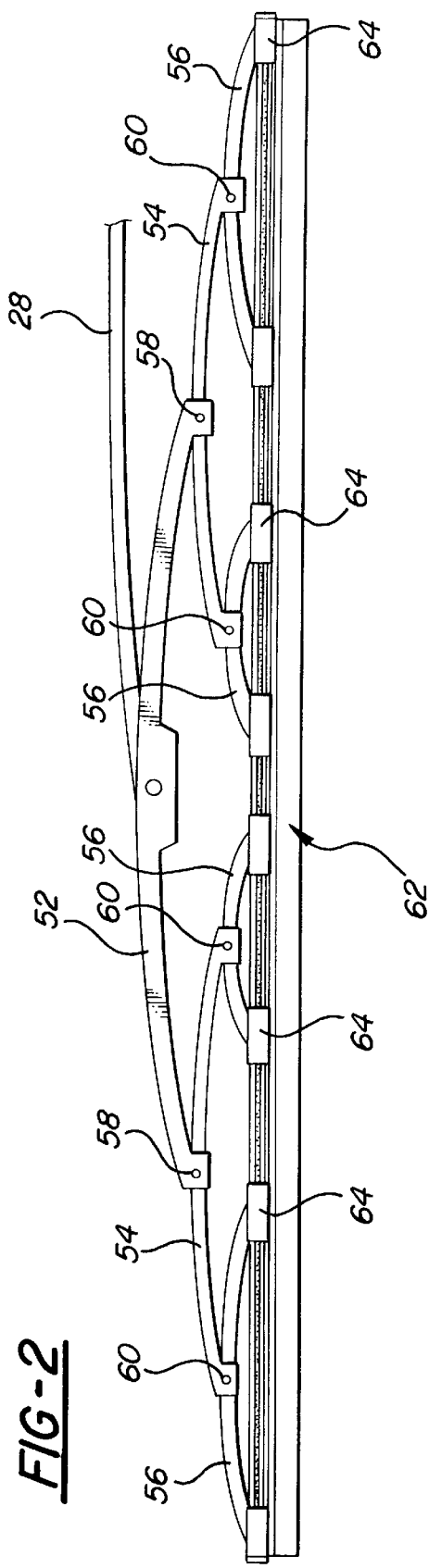
FIG. 2 is a side view of a wiper assembly of the present invention.
Figure 3:
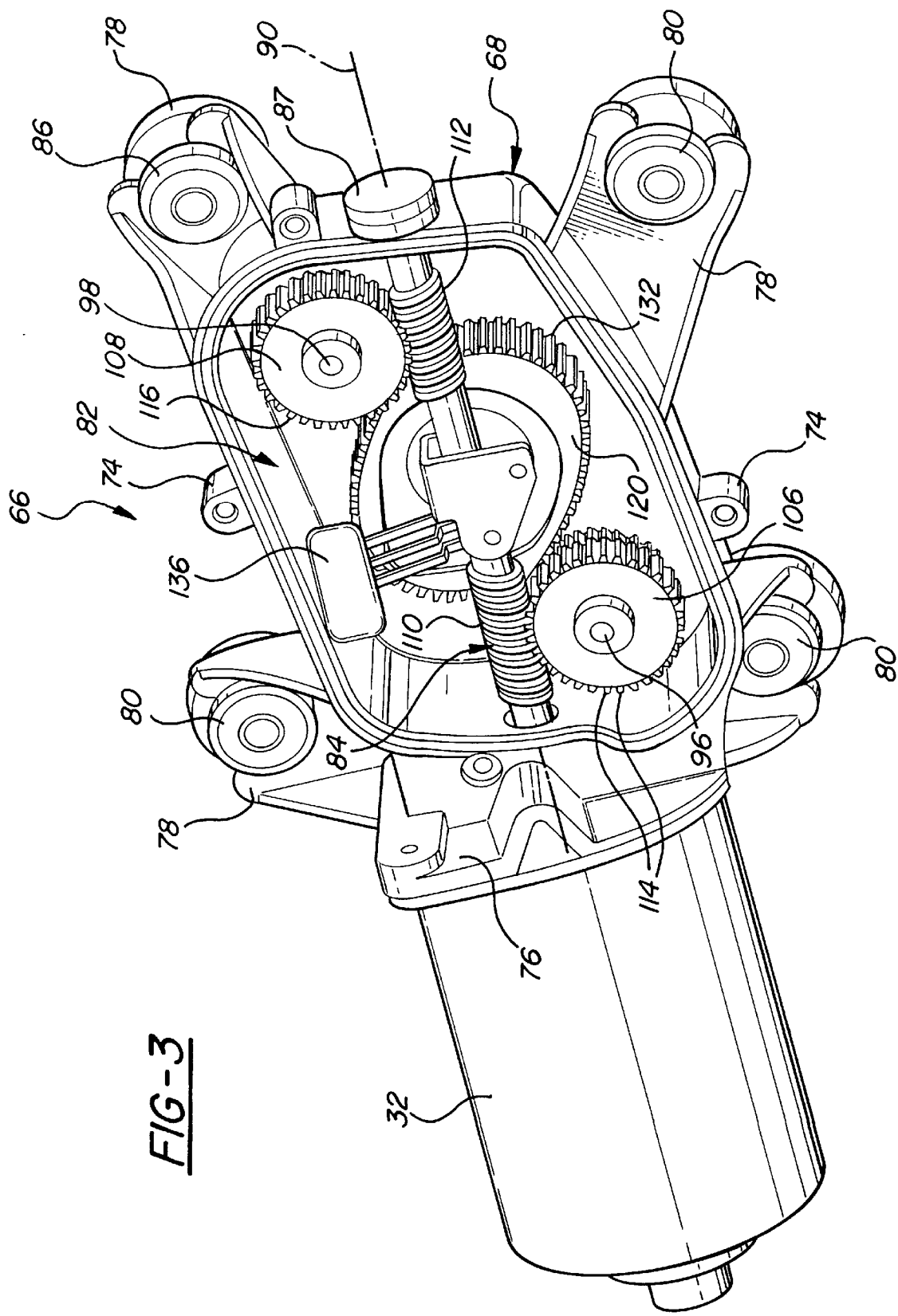
FIG. 3 is a perspective view of the wiper drive mechanism of the present invention illustrating the gearing engagement between the armature shaft and the circular gears.
Figure 4:
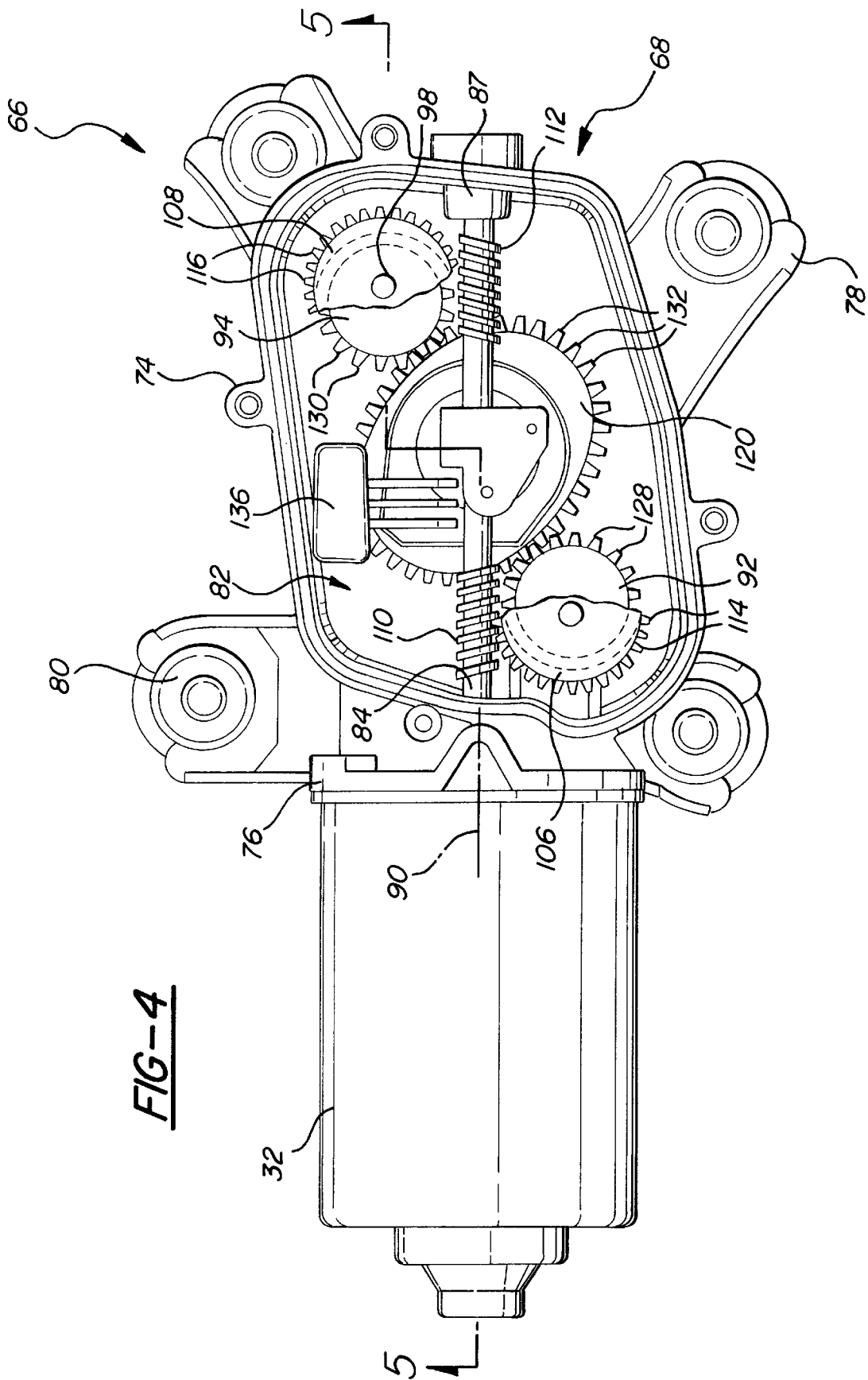
FIG. 4 is a top view of the wiper drive mechanism of the present invention.

A wiper assembly of the type employed in the windshield wiper system 22 of the present invention is illustrated in FIG. 2. Both wiper assemblies 24, 26 are identical. Accordingly, the structure of the wiper assemblies may be understood with reference to only one wiper assembly.

The wiper assemblies illustrated in the Figures have a "tournament" style superstructure including a primary lever 52, two secondary levers 54, and a series of two or more tertiary levers 56. The primary lever 52 is carried by the arm assembly 28. The secondary levers 54 are articulated to the primary lever 52 at pivot points 58 located at the opposed, lateral ends of the primary lever 52. Similarly, the tertiary levers 56 are each articulated to a secondary lever 54 at pivot points 60 located at the opposed lateral ends of the secondary levers 54. As illustrated in the Figures, the wiper assemblies include one primary lever 52, two secondary levers 54 and four tertiary levers 56, but those of ordinary skill in the art will appreciate from the discussion that follows that the blade assembly superstructure may take a number of different forms without departing from the scope of the invention.

The wiper assembly also includes an elongated rubber wiper element, generally indicated at 62. The wiper element 62 is mounted to the superstructure through claws 64 formed on the opposed distal ends of the tertiary levers 56. The working end of the wiper element 62 is operable for wiping action against the glass windshield surface 20. Each arm assembly 28, 30 includes a biasing mechanism (not shown) such as a spring that creates a force which is distributed to the wiper element 62 through the superstructure to clean the windshield 20.

Referring now back to FIG. 1, each wiper assembly 24, 26 is movable between an in-wipe position I and an out-wipe position O across the windshield. The in-wipe and out-wipe positions mark the designated limits of travel for the wiper assemblies 24, 26. In the case of the passenger side wiper assembly 26, the in-wipe position $I_p$ is located at the bottom of the windshield 20 near the cowl 12. The out-wipe position $O_p$ is located roughly in the middle of the windshield 20. On the other hand, the in-wipe position $I_d$ for the driver's side wiper assembly 24 is located at the bottom of the windshield 20 near the cowl 12. However, the out-wipe position $O_d$ is located at the right side of the windshield 20 as viewed in FIG. 1 adjacent the A-pillar 16. As can be deduced from this figure, the wipe pattern of the wiper assemblies 24, 26 somewhat overlap as is commonly known in the art.

As noted above, it is typically desirable to maximize the angular velocity of the blade assemblies 24, 26 between the in-wipe and out-wipe positions to reduce the duration of each wipe cycle. On the other hand, it is also desirable to limit noise and inertia loading by reducing the velocity of the blade assemblies 24, 26 as they approach the wipe limits.

To this end, the windshield wiper system 22 of the present invention includes a wiper drive mechanism, generally indicated at 66 in FIGS. 1 and 3–7 which is interposed between the motor 32 and the wiper assemblies 24, 26. The structure of the wiper drive mechanism 66 will now be discussed with reference to FIGS. 3 through 7. The drive mechanism 66 is supported in a shallow housing, generally indicated at 68 in FIG. 3. A cover 70, best shown in FIG. 5, closes the open end of the housing 68 and is fixed thereto via fasteners 72 received in bosses 74. The housing 68 is shown without a cover 70 in FIGS. 3–4 and 6–7. The motor 32 is also operatively connected to the housing 68 through a mounting flange 76 located at one end of the housing 68. The housing 68 also includes four mounting brackets 78 through which the motor 32 and drive mechanism 66 are mounted to the motor bracket 50 via fasteners (not shown). Isolating grommets 80 are employed at each mounting bracket 78 to dampen noise and vibration.

The drive mechanism 66 includes an elliptical gear set, generally indicated at 82, which is driven by the motor 32 through an armature shaft, generally indicated at 84. The armature shaft 84 is supported in the housing 68 by bearings 86, 87 located proximate the opposed ends of the shaft 84. The armature shaft 84 defines a longitudinal axis 90 best shown in FIGS. 4 and 6. Referring now to FIG. 7, the elliptical gear set 82 also includes a pair of eccentric gears 92, 94 disposed in driven relationship with the armature shaft 84 and symmetrically positioned on opposite sides of the longitudinal axis 90 as will be described in greater detail below.

Figure 5:
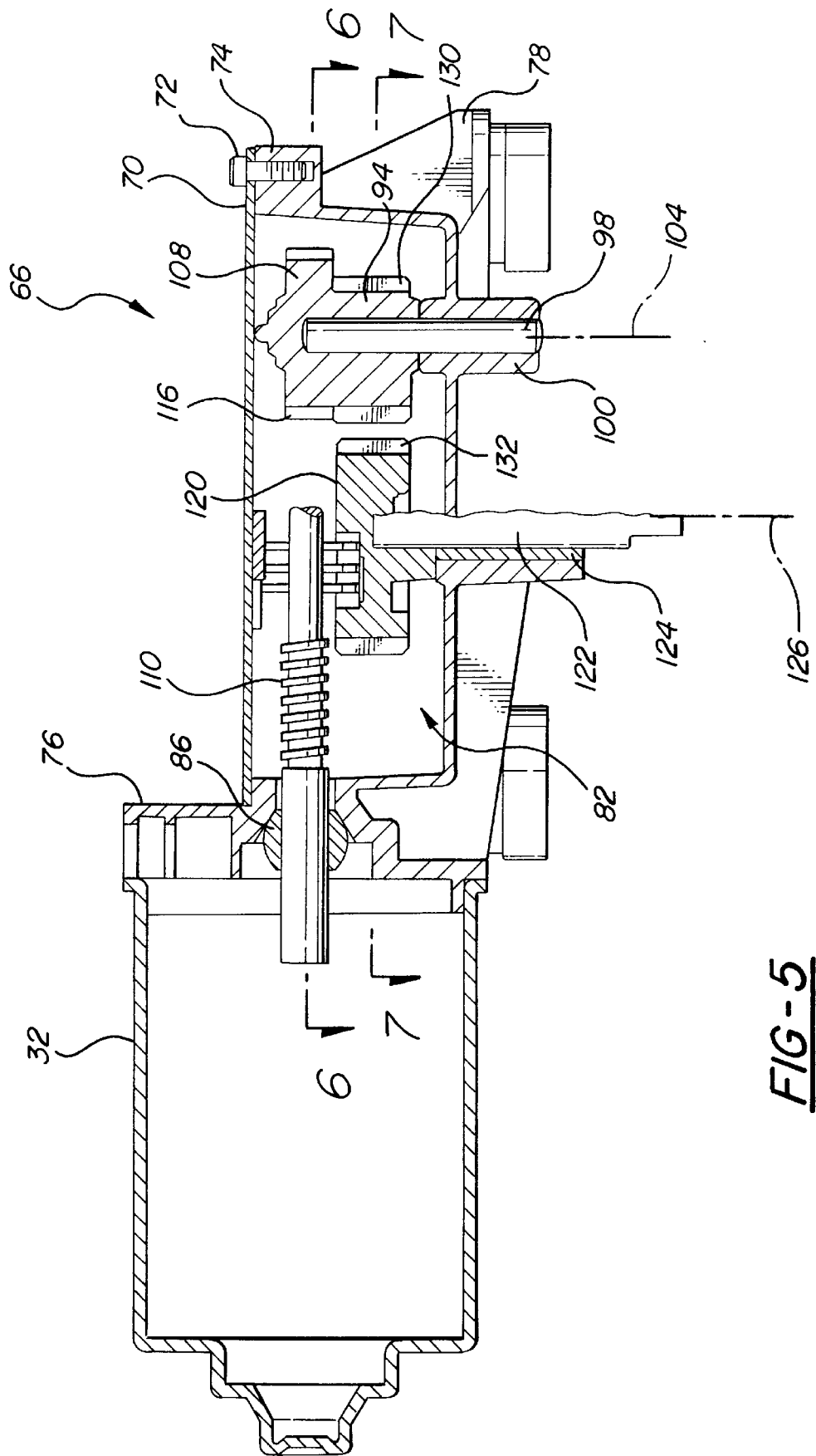
FIG. 5 is a cross-sectional side view taken substantially along lines 5—5 of FIG. 4.

The eccentric gears 92, 94 are actually circular in shape but eccentrically mounted on first and second idler shafts 96, 98, respectively. The idler shafts 96, 98 are rigidly supported in the housing 68 through bosses 100, one of which is shown in FIG. 5. The eccentric gears 92, 94 rotate about first and second axes 102, 104, respectively, as best shown in FIGS. 6 and 7.

Figure 6:
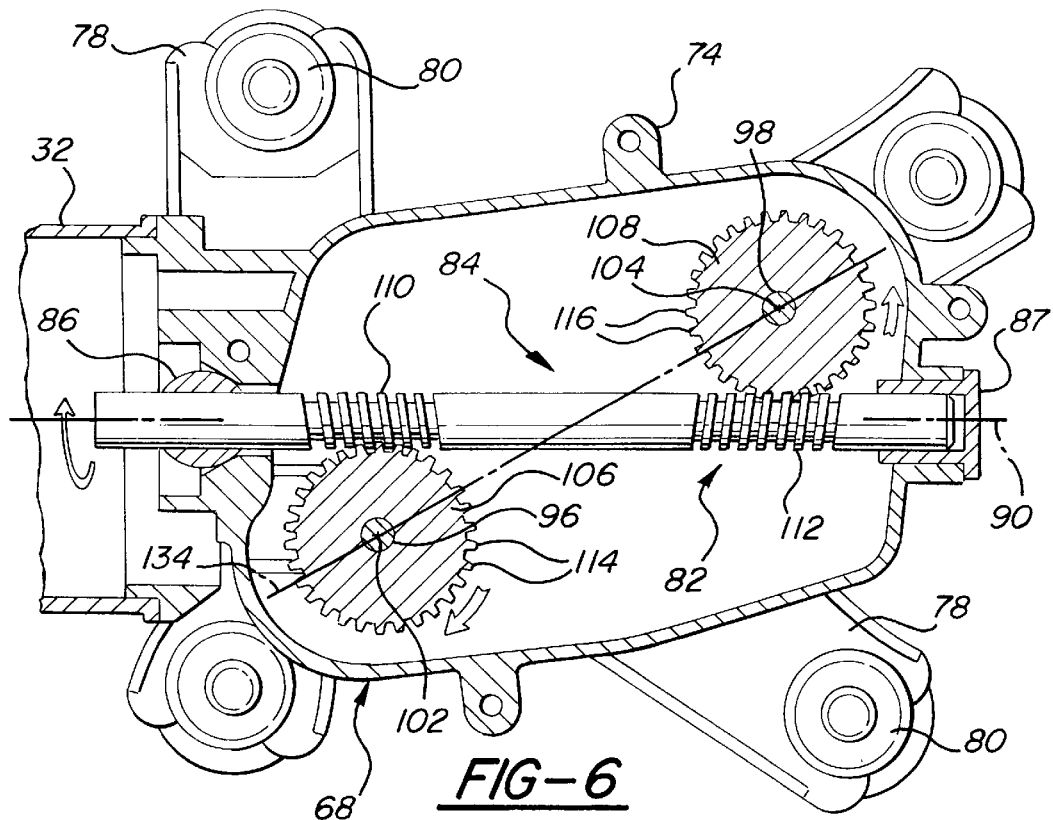
FIG. 6 is a cross-sectional view taken substantially along lines 6—6 of FIG. 5.
Figure 7:
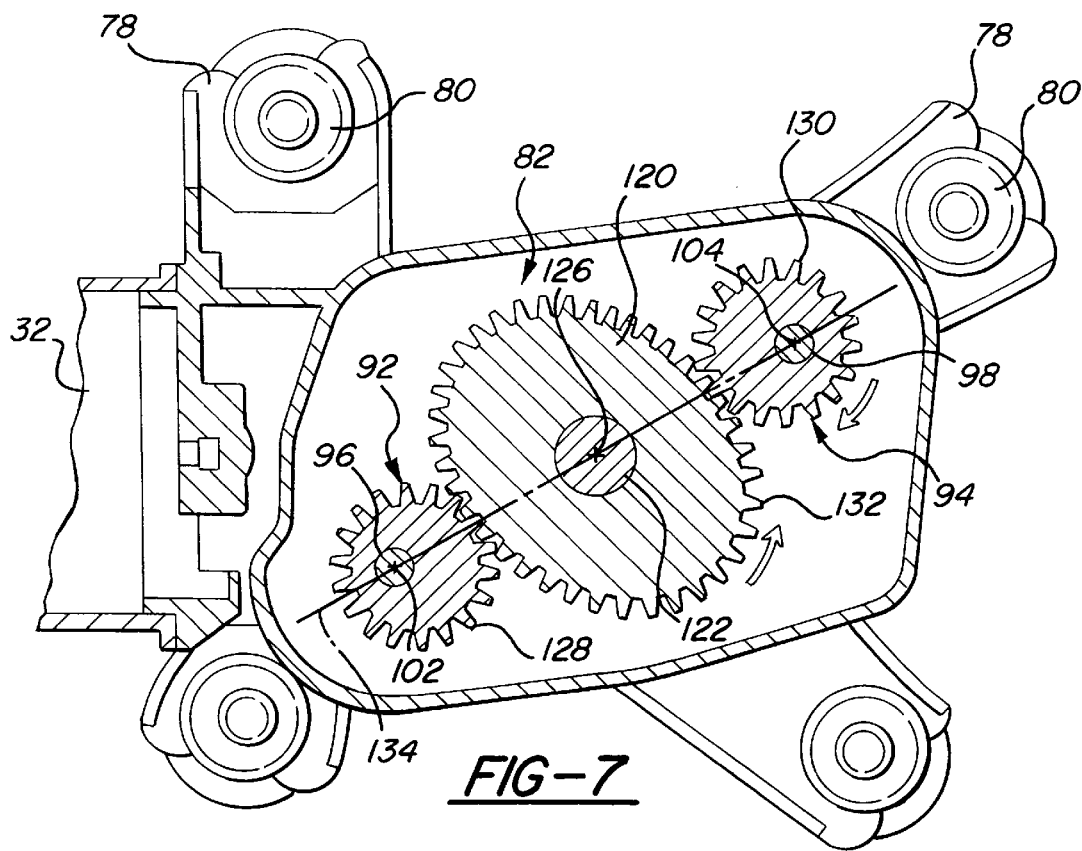
FIG. 7 is a cross-sectional view taken substantially along lines 7—7 of FIG. 5.

In addition as illustrated in FIGS. 5 and 6, the elliptical gear set 82 includes a pair of circular gears 106, 108 which are also mounted on the first and second idler shafts 96, 98, respectively and symmetrically positioned on opposite sides of the longitudinal axis 90 of the armature shaft 84. In fact, the armature shaft 84 is in driving relationship with the circular gears 106, 108 to simultaneously rotate the circular gears 106, 108 in opposite clockwise and counterclockwise directions. To this end, the armature shaft 84 has opposed, counter-balanced worm gearing formed thereon. The worm gearing has a first section 110 driving one of the pair of circular gears 106 in one direction and a second section 112 having gearing formed so as to drive the other of the pair of circular gears 108 in the opposite direction. Accordingly, the circular gears 106, 108 include teeth 114, 116, respectively which are engaged by the first 110 and second 112 sections on the armature shaft 84. In turn, the pair of eccentric gears 92, 94 may be driven by the pair of circular gears 106, 108 through first and second idler shafts 96, 98, respectively. However, as illustrated in FIG. 5, the eccentric gears 92, 94 are formed integrally with the pair of circular gears 106, 108 and so each pair rotate as a unit about their respective first and second axes 102, 104 on the idler shaft 96, 98.

The elliptical gear set 82 further includes an elliptical output gear 120 mounted on an output shaft 122. The output shaft 122 is supported by the housing 68 through bearing 124. In addition, the output shaft 122 is rotatable about an output axis 126. The elliptical output gear 120 is driven by the pair of eccentric gears 92, 94. To this end, the elliptical output gear 120 is disposed between the pair of eccentric gears 92, 94 such that the teeth 128, 130 of the eccentric gears 92, 94, respectively, engage the teeth 132 of the elliptical gear 120 at positions 180° opposite one another on the elliptical gear 120. Further, the position of the eccentric and elliptical gears are such that the respective axes 102, 104 of the first and second idler shafts 96, 98, as well as the output axis 126 on the output shaft 122, lie in a single plane, generally indicated at 134. Moreover, the longitudinal axis 90 of the armature shaft 84 may be contained in a single plane parallel to the page containing FIG. 6 and which is perpendicular to the plane 134 containing the first and second axes 102, 104 of the idler shaft 96, 98 as well as the output axes 126 of the output shaft 122.

The eccentric gears 92, 94, while rotating in opposite directions, drive the elliptical gear 120 in one direction. This arrangement serves to balance the loads placed on the system. In addition, the symmetrical orientation of the pair of circular and eccentric gears relative to the armature shaft 84 eliminates thrust loads which would otherwise act through the shaft 84 and be absorbed by the motor 32. This arrangement therefore leads to longer motor life and better reliability. There is also no need for any additional thrust bearings in the system.

The drive mechanism 66 having the elliptical gear set 82 of the present invention is also operative to drive the wiper assemblies 24, 26 through the output shaft 122 with a gear ratio that varies sinusoidally to produce maximum torque at the in-wipe and out-wipe positions I, O and a minimum torque at predetermined positions therebetween. In addition, the elliptical gear set also drives the wiper assembly 24, 26 such that the velocity of the wiper assemblies varies sinusoidally from a minimum at the in-wipe and out-wipe positions I, O to a maximum at a predetermined position therebetween. A park position sensor 136 shown in FIGS. 3 and 4 monitors the rotational position of the output shaft 122 and is employed to locate the wiper assemblies 24, 26 at their in-wipe positions when they are inoperative.

Figure 8A:
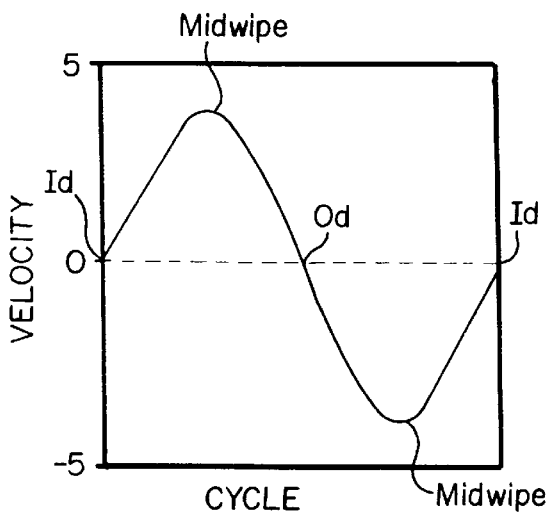
FIG. 8A is a graph of the velocity of a wiper assembly of the present invention over one wipe cycle.
Figure 8B:
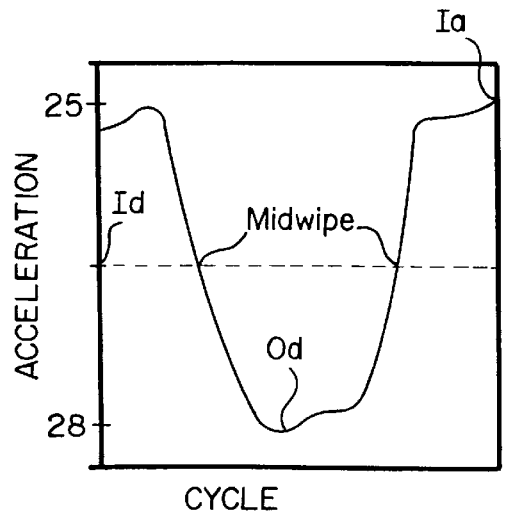
FIG. 8B is a graph of the acceleration of the wiper assembly of the present invention over one wipe cycle.

Graphs of the velocity and acceleration of a wiper assembly 24 over a wipe cycle employing the drive mechanism 66 of the present invention are shown in FIGS. 8A and 8B, respectively. FIG. 8A shows that the velocity varies sinusoidally over the wipe cycle. The velocity increases from 0 at the in-wipe position $I_d$ to a maximum at roughly the mid-wipe position which is between the in-wipe and out-wipe positions. The velocity then begins to decrease as the wiper assembly approaches the out-wipe position $O_d$ from mid-wipe. From the out-wipe position, the velocity then increases in the opposite direction toward mid-wipe in the down-wipe direction. The velocity then decreases to 0 when the wiper assembly again reaches the in-wipe position $I_d$.

The graph of acceleration of the wiper assembly over the wipe cycle shows that the acceleration is high just after the in-wipe and out-wipe positions $I_d$, $O_d$, respectively, which is just after blade reversal. However, and importantly, the peak acceleration near the out-wipe position is less drastic than similar charts of wiper assemblies of the related art. This indicates that the stresses on the windshield wiper system of the present invention are attenuated compared to those of the related art. This results in lower system inertia and thus improved linkage system life.

Figure 9:
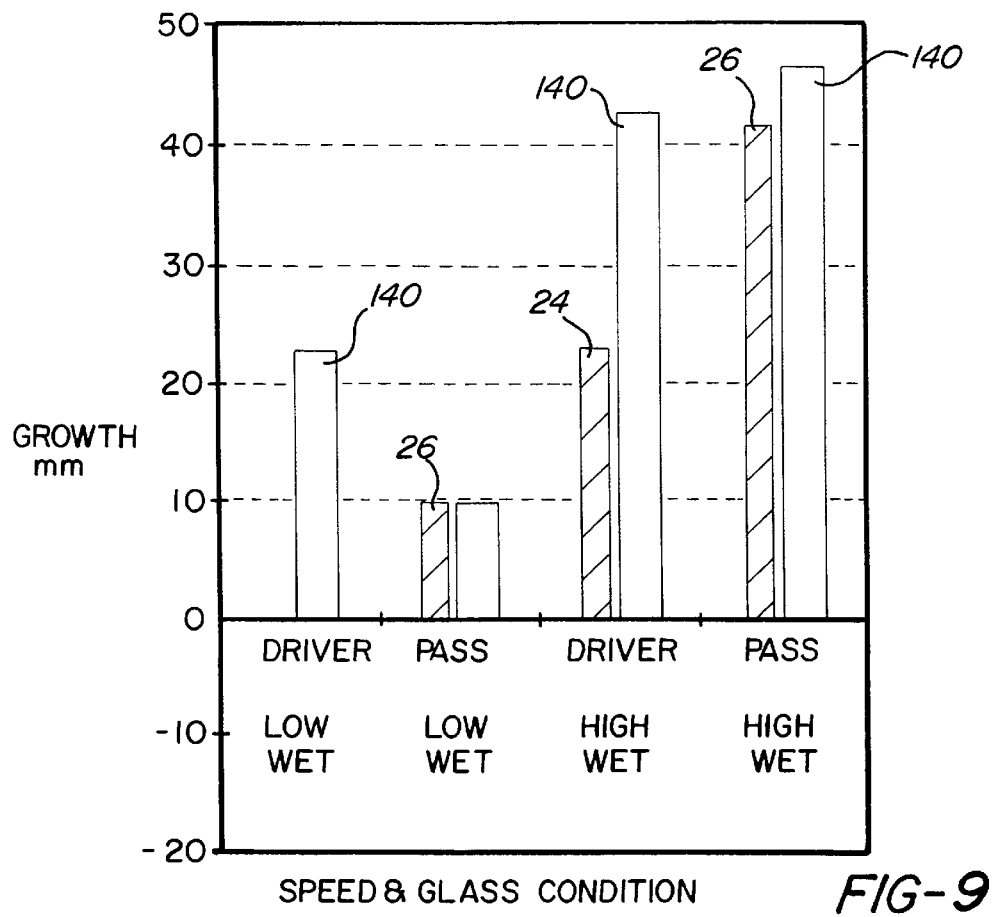
FIG. 9 is a chart comparing the growth of wipe pattern of a wiper assembly employing the drive mechanism of the present invention versus a wiper assembly employing a conventional drive mechanism.

FIG. 9 is a chart of the growth of wipe pattern relative to the speed of the wiper assemblies 24, 26 using the drive mechanism 66 of the present invention versus conventional drive mechanisms. The chart evidences improved performance for the passenger side wiper assembly 26 versus conventional drives 140 during high cycle speeds and wet conditions and a marked improvement over conventional drives for the driver's side wiper assembly 24 in the same conditions. This improvement means a lower likelihood of collisions with the A-pillar and cowls by the blade assemblies 24, 26 using the drive mechanism 66 of the present invention.

These advantages are achieved using an elliptical gear set which is economical to manufacture and implement and which occupies no more space than that allocated for current drive mechanisms used in windshield wiper systems of the related art. The drive mechanism of the present invention eliminates the need for special, complicated transmissions and electronic speed control systems often employed in the related art. In addition, the symmetrical positioning of the eccentric gears relative to the elliptical gear eliminates axial thrust loads acting on the drive motor which improves system stability and increases the useful life of the windshield wiper system.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. A windshield wiper drive mechanism interconnecting a motor and a wiper assembly movable between an in-wipe position and an out-wipe position on windshield, said drive mechanism comprising:

an elliptical gear set including a pair of eccentric gears driven by the motor and mounted on first and second idler shafts, said pair of eccentric gears being rotatable about first and second axes, respectively, and an elliptical output gear mounted on an output shaft rotatable about an output axis and driven by said pair of eccentric gears;

said elliptical output gear disposed between said pair of eccentric gears such that said eccentric gears engage said elliptical gear at positions substantially 180° opposite one another on said elliptical gear with the respective axes of said first and second idler shafts as well as said output axis of said output shaft lying in a single fixed plane;

said elliptical gear set operatively driving the wiper assembly through said output shaft with the gear ratio varying sinusoidally to produce in said output shaft maximum torque at the in-wipe and out-wipe positions and a minimum torque at a predetermined position therebetween and such that the velocity of the blade assembly varies sinusoidally from a minimum at the in-wipe and out-wipe positions to a maximum at a predetermined position therebetween.

2. A drive mechanism as set forth in claim 1 wherein said gear set includes an armature shaft driven by the motor and defining a longitudinal axis, said pair of eccentric gears disposed in driven relationship with said armature shaft and symmetrically positioned on opposite sides of said longitudinal axis.

3. A drive mechanism as set forth in claim 2 wherein said longitudinal axis of said armature shaft is contained in a plane which is perpendicular to said plane containing said first and second axes of said idler shafts and said output shaft.

4. A drive mechanism as set forth in claim 2 wherein said elliptical gear set includes a pair of circular gears mounted on said first and second idler shafts and symmetrically positioned on opposite sides of said longitudinal axis of said armature shaft with said armature shaft in driving relation with said circular gears.

5. A drive mechanism as set forth in claim 4 wherein said armature shaft has worm gearing formed thereon, said worm gearing having a first section driving one of said pair of circular gears in one direction and a second section having gearing formed so as to drive the other of said pair of circular gears in the opposite direction.

6. A drive mechanism as set forth in claim 4 wherein said pair of eccentric gears are driven by said pair of circular gears through said first and second idler shafts, respectively.

7. A drive mechanism as set forth in claim 4 wherein said pair of eccentric gears are formed integrally with said pair of circular gears.

8. A windshield wiper system comprising:

a motor, a wiper assembly movable between an in-wipe position and an out-wipe position across the windshield, and a wiper drive mechanism interposed between said motor and said wiper assembly;

said wiper drive mechanism including an elliptical gear set having a pair of eccentric gears driven by said motor and mounted on first and second idler shafts, said pair of eccentric gears being rotatable about first and second axes, respectively, and an elliptical output gear mounted on an output shaft rotatable about an output axis and driven by said pair of eccentric gears;

said elliptical output gear disposed between said pair of eccentric gears such that said eccentric gears engage said elliptical gear at positions substantially 180° opposite one another on said elliptical gear with the respective axes of said first and second idler shafts as well as said output axis on said output shaft lying in a single fixed plane;

said elliptical gear set operatively driving the wiper assembly through said output shaft with the gear ratio varying sinusoidally to produce in said output shaft maximum torque at the in-wipe and out-wipe positions and a minimum torque at a predetermined position therebetween and such that the velocity of the wiper assembly varies sinusoidally from a minimum at the in-wipe and out-wipe positions to a maximum at a predetermined position therebetween.

9. A windshield wiper system as set forth in claim 8 further including a linkage assembly interposed between said elliptical gear set and said wiper assembly for translating rotational movement of said output shaft into pivotal movement of said wiper assembly between said in-wipe and out-wipe positions.

10. A windshield wiper system as set forth in claim 8 wherein said elliptical gear set includes an armature shaft driven by said motor and defining a longitudinal axis, said pair of eccentric gears disposed in driven relationship with said armature shaft and symmetrically positioned on opposite sides of said longitudinal axis.

11. A windshield wiper system as set forth in claim 10 wherein said longitudinal axis of said armature shaft is contained in a plane which is perpendicular to said plane containing said first and second axes of said idler shafts and said output shaft.

12. A windshield wiper system as set forth in claim 10 wherein said elliptical gear set includes a pair of circular gears mounted on said first and second idler shafts and symmetrically positioned on opposite sides of said longitudinal axis of said armature shaft with said armature shaft in driving relation with said circular gears.

13. A windshield wiper system as set forth in claim 12 wherein said armature shaft has worm gearing formed thereon, said worm gearing having a first section driving one of said pair of circular gears in one direction and a second section having gearing formed so as to drive the other of said pair of circular gears in the opposite direction.

14. A windshield wiper system as set forth in claim 12 wherein said pair of eccentric gears are driven by said pair of circular gears through said first and second idler shafts, respectively.

15. A windshield wiper system as set forth in claim 12 wherein said pair of eccentric gears are formed integrally with said pair of circular gears.

* * * * *

UNITED STATES PATENT AND TRADEMARK OFFICE
CERTIFICATE OF CORRECTION

PATENT NO. : 5,983,439
DATED : 11/16/99
INVENTOR(S) : George Hojnacki

It is certified that error appears in the above-identified patent and that said Letters Patent is hereby corrected as shown below:

ABSTRACT, line 17; Application pg. 19, line 12 (Examiner's Amendment pg. 2)
Please delete "at" and insert therefor --in--

Column 7, line 33, Claim 1; Application pg. 14, line 14 (Examiner's Amendment, pg. 3)
Before "maximum" please insert --a--.

Column 8, line 24, Claim 8; Application pg. 16, line 15 (Examiner's Amendment, pg. 3)
Before "maximum" please insert --a--.

Signed and Sealed this

Twenty-third Day of May, 2000

Attest:

Q. TODD DICKINSON

*Attesting Officer*      *Director of Patents and Trademarks*